US009921868B2

United States Patent
Dong et al.

(10) Patent No.: US 9,921,868 B2
(45) Date of Patent: *Mar. 20, 2018

(54) COOPERATED INTERRUPT MODERATION FOR A VIRTUALIZATION ENVIRONMENT

(71) Applicant: Intel Corporation, Santa Clara, CA (US)

(72) Inventors: Yao Zu Dong, Shanghai (CN); Yunhong Jiang, San Jose, CA (US); Kun Tian, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/930,413

(22) Filed: Nov. 2, 2015

(65) Prior Publication Data

US 2016/0124766 A1 May 5, 2016

Related U.S. Application Data

(63) Continuation of application No. 13/516,149, filed as application No. PCT/CN2009/001480 on Dec. 17, 2009, now Pat. No. 9,176,770.

(51) Int. Cl.
*G06F 13/24* (2006.01)
*G06F 9/455* (2018.01)
(Continued)

(52) U.S. Cl.
CPC ...... *G06F 9/45558* (2013.01); *G06F 9/45545* (2013.01); *G06F 9/48* (2013.01);
(Continued)

(58) Field of Classification Search
CPC .... G06F 9/45558; G06F 9/45545; G06F 9/48; G06F 9/4812; G06F 9/5077; G06F 13/24; H04L 69/321
(Continued)

(56) References Cited

U.S. PATENT DOCUMENTS 7,209,994 B1 * 4/2007 Klaiber ............... G06F 9/45533
710/260
7,707,341 B1 * 4/2010 Klaiber ............... G06F 9/45533
710/244
(Continued)

FOREIGN PATENT DOCUMENTS

CN 101373443 2/2009
WO 2007/115425 10/2007

OTHER PUBLICATIONS

European extended search report issued in European Application No. 16182820.7, dated Nov. 21, 2016.
(Continued)

*Primary Examiner* — Paul R Myers
(74) *Attorney, Agent, or Firm* — Grossman Tucker Perreault & Pfleger, PLLC

(57) ABSTRACT

Generally, this disclosure describes systems (and methods) of moderating interrupts in a virtualization environment. An overflow interval is defined. The overflow interrupt interval is used to trigger activation of an inactive guest so that the guest may respond to a critical event. The guest, including a network application, may be active for a first time interval and inactive for a second time interval. A latency interrupt interval may be defined. The latency interrupt interval is configured for interrupt moderation when the network application associated with a packet flow is active, i.e., when the guest including the network application is active on a processor. Of course, many alternatives, variations, and modifications are possible without departing from this embodiment.

20 Claims, 4 Drawing Sheets

(51) Int. Cl.
*G06F 9/48* (2006.01)
*H04L 29/08* (2006.01)
*G06F 9/50* (2006.01)

(52) U.S. Cl.
CPC .......... *G06F 9/4812* (2013.01); *G06F 9/5077* (2013.01); *G06F 13/24* (2013.01); *H04L 69/321* (2013.01); *G06F 2009/45595* (2013.01); *G06F 2213/2408* (2013.01)

(58) Field of Classification Search
USPC ......................................................... 710/266
See application file for complete search history.

(56) References Cited

U.S. PATENT DOCUMENTS

| | | | | |
|---|---|---|---|---|
| 7,934,020 | B1* | 4/2011 | Xu | G06F 9/485 709/223 |
| 8,291,135 | B2* | 10/2012 | Subramanian | G06F 9/45558 710/39 |
| 8,612,658 | B1* | 12/2013 | Lachwani | G06F 13/24 710/262 |
| 9,176,770 | B2* | 11/2015 | Dong | G06F 9/45558 |
| 2006/0064529 | A1* | 3/2006 | Anand | G06F 13/24 710/260 |
| 2008/0162682 | A1 | 7/2008 | Ramachandran et al. | |
| 2008/0162849 | A1 | 7/2008 | Savagaonkar et al. | |
| 2008/0235426 | A1 | 9/2008 | De et al. | |
| 2010/0023666 | A1* | 1/2010 | Mansell | G06F 9/4812 710/267 |
| 2010/0077394 | A1* | 3/2010 | Wang | G06F 9/45533 718/1 |
| 2010/0128605 | A1* | 5/2010 | Chavan | H04L 47/10 370/230.1 |
| 2010/0191889 | A1* | 7/2010 | Serebrin | G06F 9/4812 710/269 |
| 2010/0223611 | A1* | 9/2010 | Mahalingam | G06F 9/45537 718/1 |
| 2010/0274940 | A1* | 10/2010 | Ahmad | G06F 9/4812 710/267 |
| 2011/0088030 | A1* | 4/2011 | Agesen | G06F 9/4825 718/1 |
| 2011/0093637 | A1* | 4/2011 | Gupta | G06F 9/4812 710/263 |
| 2013/0297832 | A1* | 11/2013 | Ahmad | G06F 13/24 710/5 |

OTHER PUBLICATIONS

Intel, "Intel VMDq Technology", Intel LAN Access Division, XP002695771, Revision 1.2, Mar. 2008, pp. 1-22.
"Method for Interrupt Moderation", XP013004515, ISSN: 1533-0001, ip.com Journal, Sep. 4, 2002, 6 pages.
"Second International Workshop on Virtualization Performance: Analysis Characterization, and Tools (VPACT 2009)", XP002695809, Apr. 26, 2009, pp. 1-3. Retrived from: http://www.ece.rice.edu/~pjv/VPACT2009.html.
Extended European Search Report received for European Patent Application No. 09852161.0, dated May 6, 2013, 9 pages.
Ahmad et al., "Improving Performance with Interrupt Coalescing for Virtual Machine Disk IO in VMware ESX Server", XP002695808, Apr. 26, 2009, 9 pages.
International Preliminary Report on Patentability and Written Opinion received for PCT Patent Application No. PCT/CN2009/001480, dated Jun. 28, 2012, 6 pages.
Prasad et al., "Effects of Interrupt Coalescence on Network Measurements", XP019004409, vol. 3015, May 6, 2004, pp. 247-256.
International Search Report and Written Opinion received for PCT application No. PCT/CN2009/001480, dated Sep. 9, 2010, 11 Pages.
Intel 82588 10 GbE Controller Datasheet, Revision No. 2.01, Jul. 2009 (820 pages).
Xen, the virtual machine monitor, The Art of Virtualizaton, Free Software Magazine Issue 6, Jun. 2005 (5 pages).
Blake et al., "A Survey of Multicore Processors [A review of their common attributes]", IEEE Signal Processing Magazine (26), Nov. 2009 (12 pages).
Dong et al., "SR-IOV Networking in Zen: Archive, Design and Implementation" (7 pages).
Guo et al., A Scalable Multithread L7-filter Design for Multi-Core Servers (9 pages).
Technology Brief, "A Superior Hardware Platform for Server Virtualization", Intel Xeon Processor (4 pages).

* cited by examiner

COOPERATED INTERRUPT MODERATION FOR A VIRTUALIZATION ENVIRONMENT

CROSS REFERENCE TO RELATED APPLICATIONS

This application is a Continuation of U.S. application Ser. No. 13/516,149 filed Sep. 26, 2012, which is a National Stage Entry of PCT/CN2009/001480 filed Dec. 17, 2009, both of which are incorporated by reference in their entirety.

FIELD

The disclosure relates to interrupt moderation in a virtualization environment.

BACKGROUND

In a virtualization environment, a processor and/or a device and/or interface may be shared by a plurality of guests. A single physical processor may be configured as a plurality of virtual CPUs. Each virtual CPU may be configured to share the physical processor resources with other virtual CPU(s). A guest may include a virtual CPU and a guest process configured to execute on the virtual CPU. Similarly, a single physical device and/or interface may be configured as a plurality of virtual devices and/or interfaces, with each virtual device and/or interface configured to share the resources of the device and/or interface with other virtual device(s) and/or interface(s).

One technique for sharing resources includes sharing processor resources in "time slices". In other words, for a plurality of guests, a subset of the plurality may be active at any point in time. As used herein, "active" means executing on at least a portion of a processor. A virtual machine monitor ("VMM") may be configured to manage scheduling guest access to the processor. The VMM may schedule a guest in ("active") or schedule a guest out ("inactive") based on time, e.g., at particular time intervals. The VMM may also be configured to schedule a guest in or out in response to an "event", e.g., an interrupt from the device.

Interrupt frequency may depend on the type of device and/or interface and/or the number of virtual devices and/or interfaces active on the device and/or interface. For example, a network adapter may be configured to interrupt a host to indicate that packets have been received. Depending on the speed of the adapter and/or the number of active virtual devices and/or interfaces and network traffic, i.e., frequency at which packets are received, a network adapter may interrupt relatively frequently.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
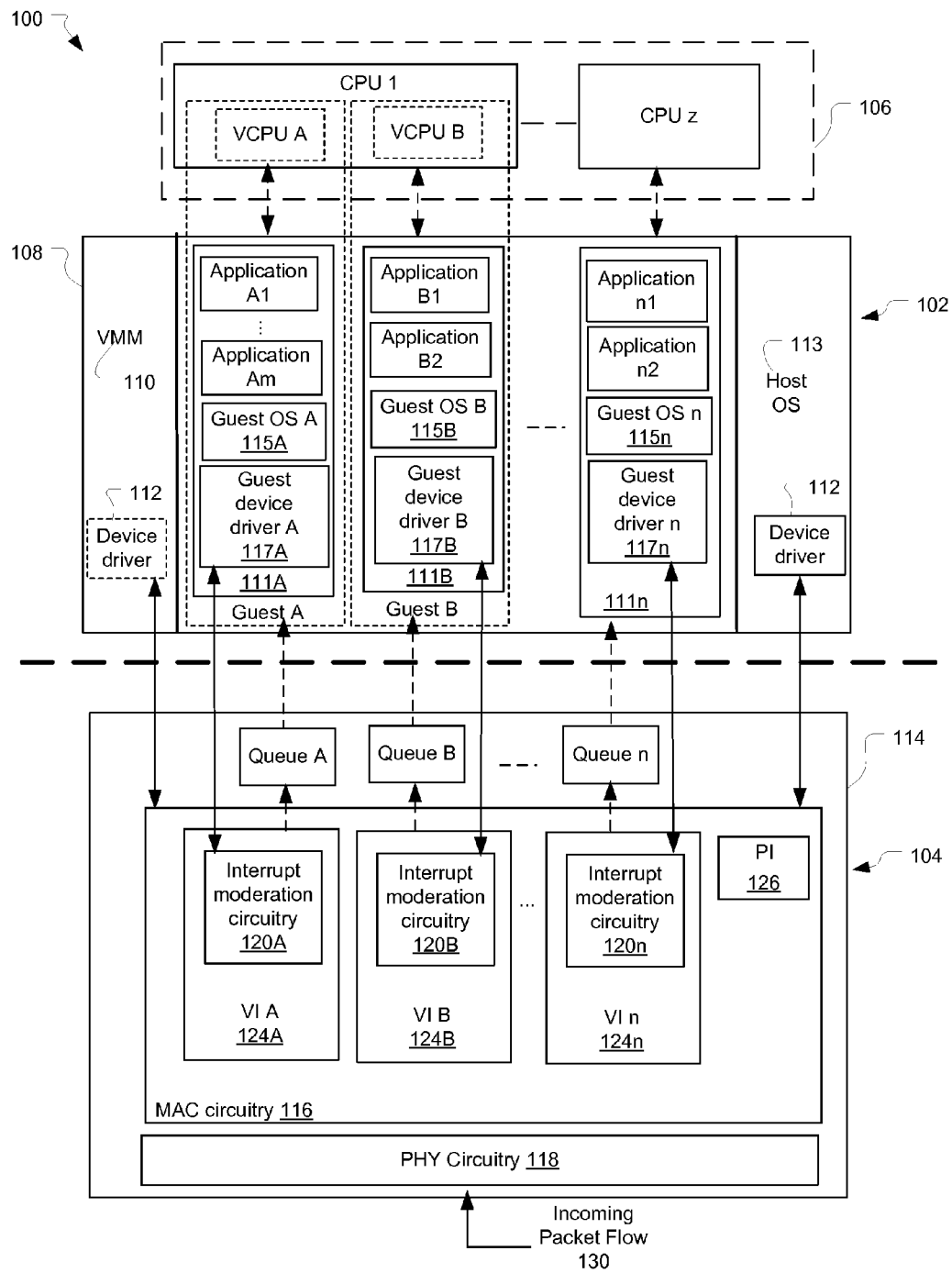
FIG. 1 illustrates one exemplary system embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure describes systems (and methods) of moderating interrupts in a virtualization environment. An overflow interval is defined. The overflow interrupt interval is used to trigger activation of an inactive guest so that the guest may respond to a critical event. For example, the overflow interrupt interval may be used to prevent receive buffer overflow, when a guest is or has/been inactive on a processor. The guest, including a network application, may be active for a first time interval and inactive for a second time interval. A latency interrupt interval may be defined. The latency interrupt interval is configured for interrupt moderation when the network application associated with a packet flow is active, i.e., when the guest including the network application is active on a processor.

A network adapter may be configured to interrupt a host based on network traffic, e.g., receiving one or more packets. Typically, packets are received in bursts. In order to reduce the number of interrupts, interrupts may be moderated. For example, the network adapter may be configured to send an interrupt to the host if a time period corresponding to the latency interrupt interval has passed since a prior interrupt and a packet in an identified packet flow has been received ("event"). In another example, a device driver in the host may be configured to delay processing received packets for a time interval. In both examples, a plurality of packets associated with the identified packet flow may be received during the time interval. The plurality of packets may then be processed by the device driver in the host.

In a virtualization environment, interrupt moderation using only the latency interrupt interval may be inadequate. For example, a guest associated with an identified packet flow may or may not be active when packet(s) corresponding to the identified flow are received. As used herein, "guest" includes a virtual CPU and an associated guest process configured to execute on the virtual CPU. Further, the "time slice" or "scheduler tick" at which the VMM is configured to schedule guests in and out may be longer than the latency interrupt interval. If the guest associated with the packet flow is inactive, the VMM may schedule the guest in response to the interrupt. The VMM shares processor resources with the guest(s). If there are a relatively large number of interrupts, the VMM may consume a significant portion of processor resources handling the interrupts. If the device is configured to reduce its interrupt frequency and/or interrupts are disabled, and packets are received, a receive buffer may overflow. Embodiments consistent with the present disclosure are configured to provide interrupts at the latency interrupt interval when packet(s) are received and an associated guest is active. Embodiments are further configured to trigger activation of an inactive guest so that the guest may respond to a critical event. For example, an interrupt at the overflow interrupt interval may be used to prevent receive buffer overflow, when the guest is or has/been inactive.

System Architecture

FIG. 1 illustrates one exemplary system embodiment consistent with the present disclosure. System 100 of this embodiment generally includes a host system 102 and a network adapter 104 in communication with the host system 102. The host system 102 of this embodiment includes a host processor 106 and system memory 108. The host processor 106 may include at least one core processing unit (hereinafter "core"), generally labeled CPU 1, . . . , CPU z. A core may host one or more virtual processing units, e.g., VCPU A and VCPU B. In this example, the virtual CPUs may share the core in time slices.

System memory 108 may host virtual machine monitor (VMM) 110, operating system code 113 (e.g., OS kernel code) and network adapter device driver code 112. The VMM 110 may include the OS kernel code 113. Network adapter device driver code 112 may be included in the VMM 110 and/or the OS kernel code 113. In some embodiments, the OS kernel code 113 and the VMM 110 may be combined. In some configurations, VMM may be implemented in circuitry, for example, in processor 106.

System memory may be configured to host at least one guest process. Each guest process 111A, B, . . . , n may include a guest device driver 117A, B, . . . , n, a guest operating system (Guest OS) 115A, B, . . . , n, and a plurality of applications. Device driver 112 and/or guest device drivers 117A, B, . . . , n, when executed, are configured to communicate with the network adapter 104, as will be explained in greater detail below. In some embodiments, a device, e.g., network adapter 104, may be dedicated to, i.e., assigned to, one guest. In this embodiment, device driver 112 may not be present and/or may not be utilized. Instead, guest device drivers 117A, . . . , n may communicate with the network adapter 104.

A guest including a VCPU and an associated guest process may be executed in a core of processor 106 when the guest is scheduled in. In other words, a guest is active when it is scheduled in and inactive when it is scheduled out. For example, as depicted in FIG. 1, VCPU A of Guest A or VCPU B of Guest B may be scheduled on CPU 1, meaning that CPU 1 has the primary responsibility for executing instructions and exchanging commands and data related to the guest operating system, guest device driver and applications associated with Guest A and Guest B. In other words, Guest A and Guest B may share CPU 1 using, for example, different time slices. It should be noted at the outset that at least one application associated with each guest process 111A, B, . . . , n running in system memory 108 may include a "network application," meaning that such an application involves receiving and/or sending packets from/to the network adaptor 104. Of course, other system applications, including non-network applications, may be running in system memory 108.

Virtual machine monitor 110 is configured to manage sharing the host processor 106 among the plurality of guest processes residing in system memory 108. Specifically, VMM 110 is configured to schedule a guest, including a guest process and virtual CPU, in a core for processing. Scheduling a guest may occur, for example, upon system initialization and may also be performed dynamically during operation of the system 100. For example, VMM 110 may be configured to activate ("schedule in") a guest at a time interval. In another example, a guest, e.g., Guest A, may be inactive and an interrupt may be received that network traffic, e.g., received packets, is available for processing by a network application and/or guest device driver of Guest A. The VMM 110 may activate Guest A in response to the interrupt. The VMM 110 may be configured to manage a state, i.e., active or inactive, of each guest. In this manner, the VMM 110 may manage scheduling associated with sharing one or more cores between a plurality of guests.

Network adapter 104 may comprise a network interface card (NIC) 114 that generally includes media access control (MAC) circuitry 116 and physical interface (PHY) circuitry 118. MAC circuitry 116 may be configured to assemble data to be transmitted into packets, that include destination and source addresses along with network control information and error detection hash values. PHY circuitry 118 may include encoding and decoding circuitry (not shown) to encode and decode data packets. NIC 114 may be coupled to a medium to receive one or more packet flows, as indicated by packet flow 130. NIC 114 may also include a plurality of receive queues, labeled Queue A, Queue B, . . . , Queue n. Receive queues Queue A, Queue B, . . . , Queue n are configured to reference packets associated with a particular application received by the NIC 114 (via incoming packet flow 130).

Network traffic associated with a packet flow may be identified based on one or more fields in each packet in the packet flow. For example, the packet flow ID for a TCP packet may include a sequence of source IP address, destination IP address, source port number, and destination port number, L2/L4 data, etc., any of which can be utilized to ID the packet flow. Of course, other packet protocols may be identified, e.g., using UDP packet information. An identified packet flow may be associated with a network application in a guest. When a packet associated with the packet flow ID is received, the guest may be active (corresponding to executing on at least a portion of processor 106) or the guest may be inactive.

A network adapter 104 consistent with the present disclosure may include a physical interface PI 126 and a plurality of virtual interfaces VIs 124A, . . . , n. The physical interface 126 is configured to manage physical resources of the network adapter 104 and may be configured to communicate with device driver 112 associated with host OS 113 and VMM 110. The physical interface 126 may be configured to manage sharing the network adapter between the virtual interfaces 124A, B . . . , n. Each virtual interface 124A, B . . . , n may include interrupt moderation circuitry 120A, . . . , n. Interrupt moderation circuitry 120A, . . . , n may be configured to moderate interrupts for packet flows associated with each virtual interface 124A, B . . . , n.

In a virtualization environment, a guest in the host and a virtual function and queue in the network adapter may be configured as a "complete" system. Although the guest and virtual function are sharing physical resources, it may appear to the guest and virtual function that each "owns" its respective physical resource. The scheduling and processing associated with sharing the physical resources may generally be performed by the VMM 110 and PI 126. The VMM 110 may be configured to manage the PI 126.

Figure 2:
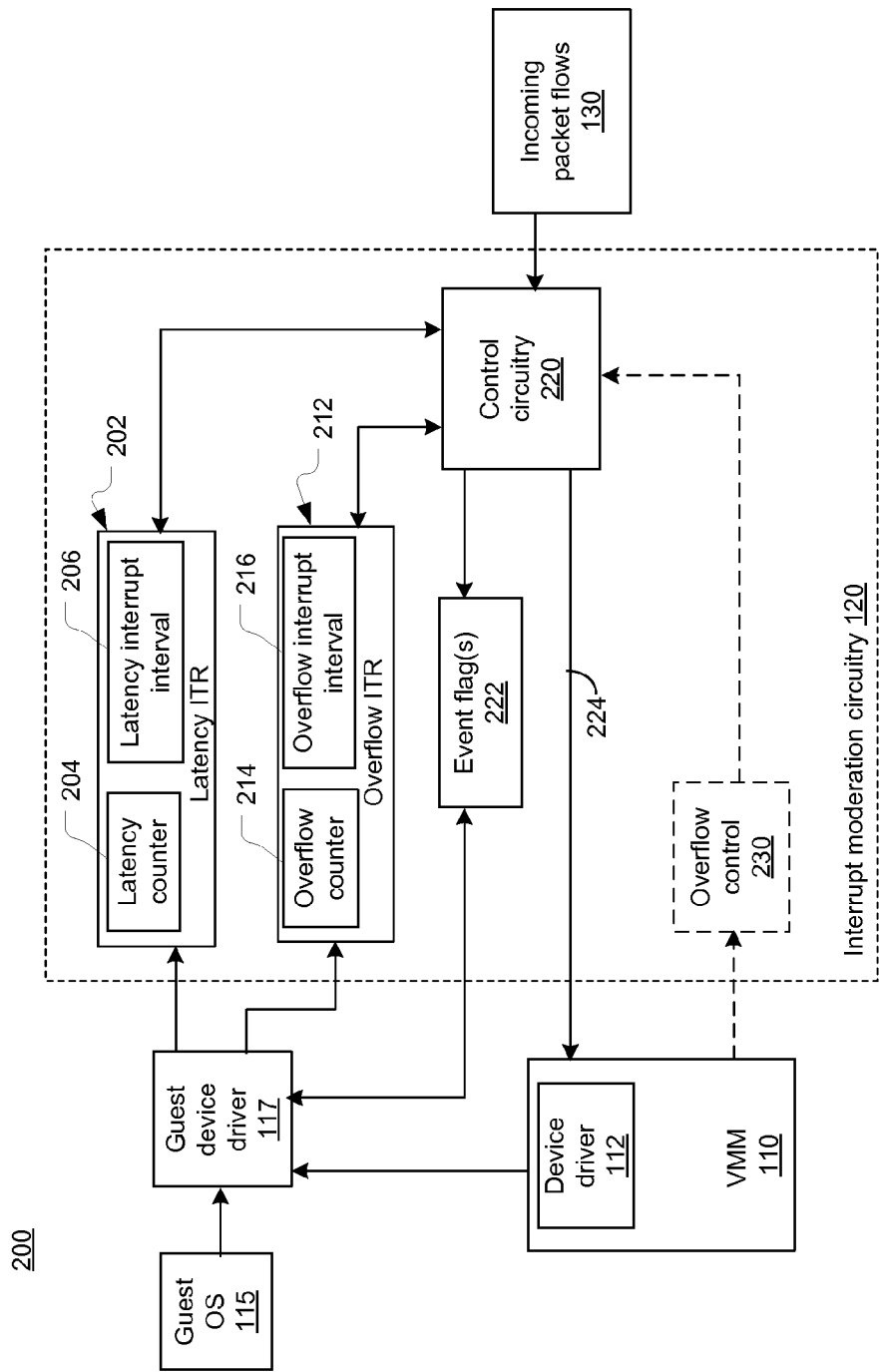
FIG. 2 illustrates a functional block diagram of two exemplary embodiments of interrupt moderation and interrupt moderation circuitry consistent with the present disclosure.

FIG. 2 is a functional block diagram 200 illustrating two exemplary embodiments of interrupt moderation circuitry 120A, . . . , n. For simplicity, in FIG. 2, the designators, i.e., A, B, . . . , n have been omitted. The functional block diagram 200 applies to any one or more of the virtual functions 120A, . . . , n in FIG. 1. In FIG. 2, certain portions of the system 100 depicted in FIG. 1 have been omitted for clarity (for example, CPU 106, system memory 108, MAC circuitry 116 and PHY circuitry 118), but it is to be understood that like parts of FIG. 2 can be implemented in a manner consistent with an embodiment depicted in FIG. 1, or alternatively in other system implementations, without departing from this embodiment.

A first exemplary embodiment includes an overflow control register 230 while a second exemplary embodiment does not include the overflow control register 230. Both embodiments include a latency interrupt register "latency ITR" 202, an overflow interrupt register "overflow ITR" 212, control circuitry 220 and an event flag(s) register 222. The latency ITR 202 may include a latency counter 204 and a latency interrupt interval 206. Similarly, the overflow ITR 212 may include an overflow counter 214 and an overflow interrupt interval 216. Latency ITR 202 is configured to facilitate interrupt moderation at a latency interrupt interval. Overflow ITR 212 is configured to facilitate providing an interrupt at an overflow interrupt interval for the virtual function associated with interrupt moderation circuitry 120 and the virtual function's associated guest.

The latency interrupt interval 206 may be determined based on interrupt moderation in a native environment. In other words, the latency interrupt interval 206 is configured for a guest that is active. The overflow interrupt interval 216 is configured to trigger activation of an associated guest so that the associated guest may respond to a critical event. For example, the overflow interrupt interval may be used to prevent receive buffer overflow, when the associated guest is or has/been inactive. For example, the overflow interrupt interval 216 may be determined based, at least in part, on a size of the receive buffer and a speed of the network adapter. If network traffic is received, destined for the associated guest, and the associated guest is not active, the received packets may be placed in the associated guest's receive buffer by direct memory access. If the associated guest is not scheduled in so that the guest device driver and/or network application may process the packets, the interrupt moderation circuitry 120 is configured to cause an interrupt to the VMM at the expiration of the overflow interrupt interval. This interrupt is configured to result in the VMM scheduling in the associated guest and removal of the packets from the receive buffer for processing.

For example, latency interrupt interval 206 and overflow interrupt interval 216 may be configured to store an interval count corresponding to a time duration of a latency interrupt interval and a time duration of an overflow interrupt interval, respectively. Each respective counter 204, 214 may then be configured to count down from latency interrupt interval 206 and overflow interrupt interval 216, respectively, to zero. When latency counter 204 and/or overflow counter 214 reach(es) zero, Control circuitry 220 may be configured to determine whether an event flag in the event flag(s) register 222 indicates that a packet associated with a packet flow ID has been received. If such a packet has been received, control circuitry 220 is configured to generate interrupt 224 to VMM 110. VMM 110 and/or device driver 112 may then send an interrupt to guest device driver 117.

The latency counter 204 and overflow counter 214 are configured to be reset (and counting commenced) by guest device driver 117 and/or control circuitry 220, as will be described in more detail below. For example, each counter 204, 214 may be reset when an interrupt is triggered. In another example, latency counter 204 may be reset by guest device driver based, at least in part, on packet processing in guest.

Although counters 204, 214 and interrupt intervals 206, 216 have been described above as count-down counters and counting intervals, respectively, other configurations are possible. For example, counters 204, 214 may count up to interrupt intervals 206, 216, respectively. In another example, counters 204, 214 may correspond to timers and interrupt intervals 206, 216 may correspond to time out intervals.

Control circuitry 220 is configured to receive and/or to receive an indication of incoming packet flow(s) 130. Event flag(s) register 222 is configured to store an event flag associated with a respective packet flow destined for an application in an associated guest. Control circuitry 220 is configured to set an event flag in the event flag(s) register 222 indicating that a packet corresponding to a packet flow ID has been received. For example, control circuitry 220 may set the associated event flag when a first packet is received corresponding to an associated packet flow ID. "First packet" means the first packet received following an associated interrupt. The event flag may be cleared when an interrupt is triggered.

Control circuitry 220 may be configured to generate an interrupt 224 to VMM 110 if a latency interrupt interval expires and/or an overflow interrupt interval expires, and the event flag indicates that an associated packet has been received. If the associated guest is active, VMM 110 may forward the interrupt to the associated guest device driver 117. In an embodiment, control circuitry 220 may be configured to generate an interrupt 224 to associated guest device driver 117 if a latency interrupt interval expires and to VMM 110 if an overflow interrupt interval expires, and the event flag indicates that an associated packet has been received. In this embodiment, an interrupt vector associated with the interrupt may indicate (identify) the associated guest driver. In some embodiments, control circuitry 220 may be configured to reset latency counter 204 and/or overflow counter 206. In some embodiments, guest device driver 117 may be configured to reset latency counter 204 and/or overflow counter 206 and/or event flag(s).

In the first exemplary embodiment, overflow control 230 may be configured to indicate whether a guest is active or inactive. VMM 110 and/or device driver 112 may be configured to set and/or reset a guest state indicator in overflow control register 230 when VMM 110 schedules guest in (active) or out (inactive). The associated guest device driver 117 may be configured to set the guest state indicator when guest becomes active. For example, the guest state indicator may be set and/or reset using a memory mapped input/output ("MMIO") operation.

As described herein with respect to FIGS. 1 and 2, interrupt moderation circuitry 120 is configured to generate an interrupt to its associated guest device driver 117 and/or to VMM 110 when latency interrupt interval and/or overflow interrupt interval expires and a packet corresponding to an associated packet flow ID has been received.

Exemplary Methodology

Figures 3A, 3B:
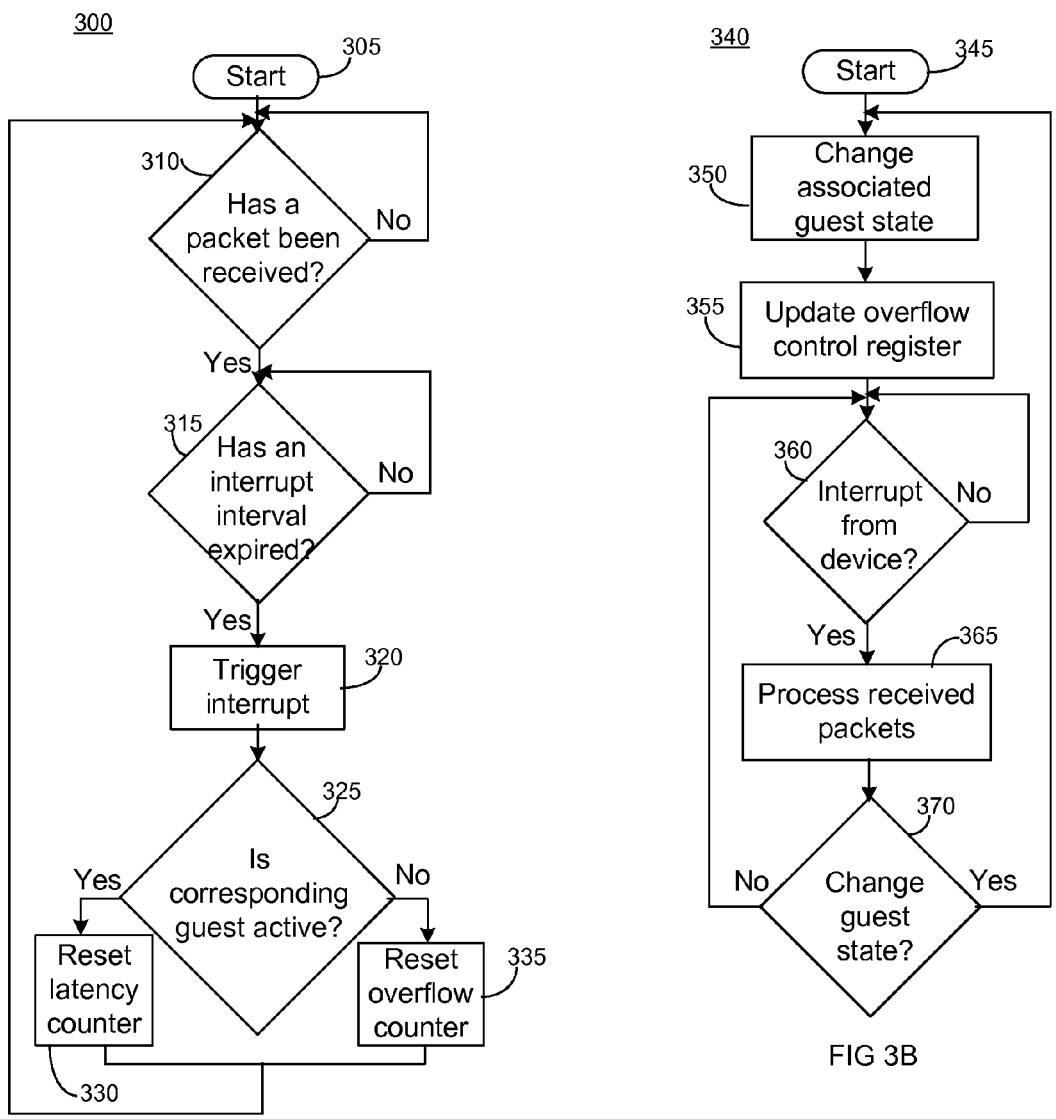
FIGS. 3A and 3B illustrate two flowcharts of exemplary operations consistent with the present disclosure.

FIGS. 3A and 3B illustrate flowcharts 300, 350 of exemplary operations consistent with the present disclosure. The operations illustrated in this embodiment may be performed by circuitry and/or software modules associated with a network adaptor (e.g., adapter 104 depicted in FIG. 1), or such operations may be performed by circuitry and/or software modules associated with a host system (or other components, e.g., Guest/VCPU), or a combination thereof.

Turning to FIG. 3A, operations of this embodiment may be performed by network adapter 104, e.g., by interrupt moderation circuitry 120. For example, operations of this embodiment may be performed by interrupt moderation circuitry 120A in virtual function 124A for associated guest 111A. Operations of this embodiment may begin at start 305. At operation 310 of this embodiment, whether a packet has been received may be determined. For example, a packet associated with a packet flow may be received by virtual function 124A. An event flag in event flag(s) register 222 of interrupt moderation circuitry 120 may be set. Operation 310 may read the event flag to determine whether a packet has been received. If a packet has not been received, e.g., event flag is not set, program flow may pause at operation 310 until a packet has been received.

If a packet has been received, i.e., event flag is set, whether an interrupt interval has expired may be determined at operation 315. The interrupt interval may be the latency interrupt interval or the overflow interrupt interval. If an interrupt interval has not expired, program flow may pause at operation 315 until an interrupt interval expires. If an interrupt interval has expired, an interrupt may be triggered 320.

At operation 325, whether an associated guest, e.g., Guest 111A, is active may be determined. For example, overflow control register 230 may be queried to determine the state of the associated guest. If the associated guest is active, latency counter 204 may be reset at operation 330 and may begin counting corresponding to starting a latency interrupt interval. If the associated guest is not active, overflow counter 214 may be reset at operation 335 and may begin counting corresponding to starting an overflow interrupt interval.

These exemplary operations are configured to trigger an interrupt at the overflow interrupt interval if the guest associated with a packet flow ID is inactive and an associated packet is received or to trigger an interrupt at the latency interrupt interval if the guest is active and an associated packet is received.

Turning to FIG. 3B, operations of this embodiment may be performed, for example, by a VMM in the host system and/or an associated guest device driver. As described herein, the VMM may be implemented in circuitry and/or software. Operations of this embodiment may begin at start 345. At operation 350 of this embodiment, the state of an associated guest may be changed. For example, an active guest may be scheduled out or the inactive guest may be scheduled in. For example, the state of the guest may be changed (i.e., scheduled) based on a timer. In another example, the state of the guest may be changed based on an event, e.g., an interrupt to the VMM. At operation 355, the overflow control register 230 may be updated. The overflow control register 230 in the interrupt moderation circuitry 120 is configured to indicate the guest state to control circuitry 220 to support resetting and starting the appropriate interval counter. The overflow control register 230 may be updated by the VMM 110 and/or a guest device driver, when a guest is scheduled in.

Whether an interrupt from a device, e.g., network adapter 104, has been received may then be determined 360. If such an interrupt has not been received, program flow may pause at operation 360 until an interrupt is received. If an interrupt is received, the VMM may provide a virtual interrupt to the associated guest, so that received packets associated with the interrupt may be processed by, e.g., the associated guest device driver and/or network application running in the associated guest, if the guest is active. If the guest is not active when the interrupt is received, the guest may be scheduled in by the VMM.

Whether to change the guest state may be determined at operation 370. If the guest state is to be changed, program flow may proceed to operation 350. If the guest state is not to be changed, program flow may proceed to operation 360 to determine whether an interrupt from a device has been received.

Figure 4A:
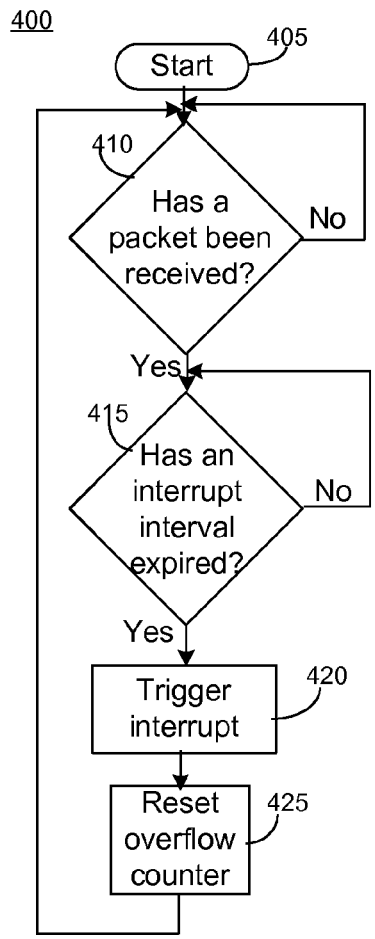
FIGS. 4A and 4B illustrate two more flowcharts of exemplary operations consistent with the present disclosure.
Figure 4B:
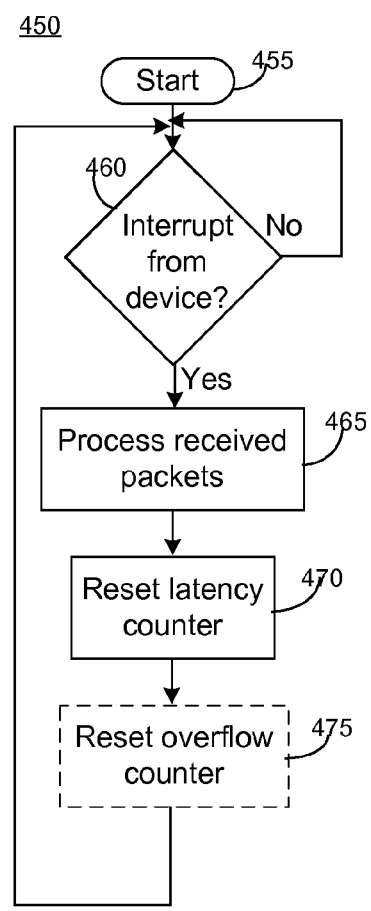

FIGS. 4A and 4B illustrate flowcharts 400, 450 of exemplary operations of another embodiment consistent with the present disclosure. The operations illustrated in this embodiment may be performed by circuitry and/or software modules associated with a network adaptor (e.g., adapter 104 depicted in FIG. 1), or such operations may be performed by circuitry and/or software modules associated with a host system (or other components, e.g., Guest/VCPU), or a combination thereof.

Turning to FIG. 4A, operations of this embodiment may be performed by network adapter 104, e.g., by interrupt moderation circuitry 120. For this embodiment, it is assumed that the latency overflow counter is reset by a guest device driver when the associated guest is active. The guest device driver may also reset the overflow counter. It is further assumed that the overflow counter has been reset. Operations according to this embodiment may begin at start 405. Whether a packet has been received may be determined 410. For example, a packet associated with a packet flow may be received by virtual interface 124A. An event flag in event flag(s) register 222 of interrupt moderation circuitry 120 may be set. Operation 410 may read the event flag to determine whether a packet has been received. If a packet has not been received, e.g., event flag is not set, program flow may pause at operation 410 until a packet has been received.

If a packet has been received, i.e., event flag is set, whether in interrupt interval has expired may be determined at operation 415. For example, the overflow interrupt interval and/or the latency interrupt interval may be expired. If an interrupt interval has not expired, program flow may pause at operation 415. If an interrupt interval has expired, flow may proceed to operation 415 and an interrupt may be triggered 420. For example, the interrupt may be provided from interrupt moderation circuitry 120 to an associated guest device driver and/or to the VMM 110. At operation 425, the overflow counter may be reset, starting an overflow interrupt interval. Flow may then proceed to operation 410.

Turning to FIG. 4B, operations of this embodiment may be performed, for example, by a VMM in the host system and/or a guest device driver. Operations according to this embodiment may begin at start 455. Operation 460 may include determining whether an interrupt from a device, e.g., network adapter 104, has been received. If a interrupt has not been received, program flow may pause at operation 460 until an interrupt is received. If an interrupt has been received, received packets may be processed at operation 465. For example, if the guest associated with the packets is active, the guest device driver and/or a network application may process the received packets. If the guest is inactive, the VMM 110 may schedule in the guest to process the packets.

Operation 470 may include resetting the latency counter. For operation 470, it is assumed that the guest is active. For example, the guest device driver and/or network application may be configured to reset the latency counter upon completion of packet processing. Operation 475 may be included in some embodiments. Operation 475 includes resetting the overflow counter. The overflow counter may be reset at the completion of packet processing, similar to resetting the latency counter. Program flow may then proceed to operation 460.

The embodiments illustrated in FIGS. 4A and 4B are configured to provide interrupt moderation at the latency interrupt interval when a guest is active and to provide an interrupt at the overflow interrupt interval, e.g., to prevent receive buffer overflow. The embodiments illustrated in FIGS. 4A and 4B do not include an explicit guest state register. Rather a guest device driver may be configured to reset the latency counter when it completes packet processing, thereby implicitly "informing" a network adapter that the guest associated with a packet flow is active.

While the foregoing is prided as exemplary system architectures and methodologies, modifications to the present disclosure are possible. For example, operating system 113, VMM 110 and/or guest operating system(s) 115A, . . . , n may manage system resources and control tasks that are run on system 102. For example, guest OS 115A, . . . , n may be implemented using Microsoft Windows, HP-UX, Linux, or UNIX, although other operating systems may be used. When a Microsoft Windows operating system is used, the ndis.sys driver may be utilized at least by guest device driver 117A, . . . , n and an intermediate driver (not shown). For example, the ndis.sys driver may be utilized to define application programming interfaces (APIs) that can be used for transferring packets between layers.

Guest operating system 115A, . . . , n may implement one or more protocol stacks (not shown). A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine.

Other modifications are possible. For example, memory 108 and/or memory associated with the network adaptor 104 (not shown) may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 108 and/or memory associated with the network adaptor 104 (not shown) may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor of FIG. 1) and/or programmable circuitry such as the MAC circuitry. Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 Ethernet communications protocol, which may include, for example, 100BASE-TX, 100BASE-T, 10GBASE-T, 10GBASE-KR, 10GBASE-KX4/XAUI, 40 GbE and or 100 GbE compliant PHY circuitry, and/or PHY circuitry that is compliant with an after-developed communications protocol.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method of moderating interrupts in a virtualization environment supported by a host system, the host system comprising a host processor, and a guest executed on the host processor, the guest comprising a virtual processor and a guest process executed on the virtual processor, the guest process comprising a network application associated with a packet flow, the method, comprising:
    generating, using at least one of interrupt moderation circuitry or interrupt moderation software, a first interrupt from the device to the host when the guest is inactive based on, at least in part, an overflow interrupt interval and a packet associated with the network application has been received by the device, said first interrupt configured to activate said guest so that said guest may respond to said receive buffer overflow event; and
    generating, using at least one of said interrupt moderation circuitry or said interrupt moderation software, a second interrupt from the device when the guest is active on the host system based on a latency interrupt interval and a packet associated with the network application has been received by the device.

2. The method of claim 1, further comprising:
    indicating whether the guest is active or inactive using a register in the device;
    updating the register with the host when a state of the guest changes; and
    determining whether the guest is active or inactive based, at least in part, on the register.

3. The method of claim 2, wherein said latency interrupt interval is related to a latency counter and said overflow interrupt interval is related to an overflow counter, and the method further comprising:
    when the guest is active, resetting the latency counter by starting another latency interrupt interval; and when the guest is inactive, resetting the overflow counter by starting another overflow interrupt interval.

4. The method of claim 1, wherein said overflow interrupt interval is related to an overflow counter, and the method further comprises:
resetting the overflow counter by starting another overflow interrupt interval, based on the first interrupt or the second interrupt.

5. The method of claim 1, wherein said latency interrupt interval is related to a latency counter, and the method further comprises:
when the second interrupt is received by the host system, processing the packet associated with the network application; and resetting the latency counter with the host system by starting another latency interrupt interval.

6. The method of claim 5, wherein said overflow interrupt interval is related to an overflow counter, and the method further comprises:
when the first interrupt is received by the host system, processing the packet associated with the network application and resetting the overflow counter with the host by starting another overflow interrupt interval.

7. The method of claim 1, wherein at least one of said first or said second interrupt are generated using interrupt moderation circuitry.

8. The method of claim 1, wherein at least one of said first or said second interrupt are generated using interrupt moderation software.

9. One or more computer-readable storage memories having stored thereon, individually or in combination, instructions for moderating interrupts in a virtualization environment supported by a host system, the host system comprising a host processor, and a guest executed on the host processor, the guest comprising a virtual processor and a guest process executed on the virtual processor, the guest process comprising a network application associated with a packet flow, the instructions, when executed by one or more processors, result in the following operations comprising:
when the guest is inactive, generating a first interrupt from the device to the host based on, at least in part, an overflow interrupt interval and a packet associated with the network application has been received by the device, said first interrupt configured to activate said guest so that said guest may respond to said receive buffer overflow event; and
when the guest is active on the host system, generating a second interrupt from the device based on a latency interrupt interval and a packet associated with the network application has been received by the device.

10. The one or more computer-readable memories of claim 9, wherein the instructions that when executed by one or more of the processors result in the following additional operations comprising:
indicating whether the guest is active or inactive using a register in the device;
updating the register with the host when a state of the guest changes; and
determining whether the guest is active or inactive based, at least in part, on the register.

11. The one or more computer-readable memories of claim 10, wherein said latency interrupt interval is related to a latency counter and said overflow interrupt interval is related to an overflow counter, the instructions that when executed by one or more of the processors result in the following additional operations comprising:

when the guest is active, resetting the latency counter by starting another latency interrupt interval; and
when the guest is inactive, resetting the overflow counter by starting another overflow interrupt interval.

12. The one or more computer-readable memories of claim 9, wherein said overflow interrupt interval is related to an overflow counter, the instructions that when executed by one or more of the processors result in the following additional operations comprising:
resetting the overflow counter by starting another overflow interrupt interval, based on the first interrupt or the second interrupt.

13. The one or more computer-readable memories of claim 9, wherein said latency interrupt interval is related to a latency counter, the instructions that when executed by one or more of the processors result in the following additional operations comprising:
when the second interrupt is received by the host system, processing the packet associated with the network application; and resetting the latency counter with the host system by starting another latency interrupt interval.

14. The one or more computer-readable memories of claim 13, wherein said overflow interrupt interval is related to an overflow counter, the instructions that when executed by one or more of the processors result in the following additional operations comprising:
when the first interrupt is received by the host system, processing the packet associated with the network application and resetting the overflow counter with the host by starting another overflow interrupt interval.

15. A system comprising:
a network adapter configured to be coupled to a host system, the host system comprising a host processor, and a guest executed on the host processor, the guest comprising a virtual processor and a guest process executed on the virtual processor, the guest process comprising a network application associated with a packet flow, said network adapter comprising interrupt moderation circuitry to:
generate a first interrupt when the guest is inactive, to the host based on, at least in part, an overflow interrupt interval and a packet associated with the network application has been received by the device, said first interrupt configured to activate said guest so that said guest may respond to said receive buffer overflow event; and
generate a second interrupt when the guest is active on the host system based on a latency interrupt interval and a packet associated with the network application has been received by the device.

16. The system of claim 15, wherein:
the host is configured to:
indicate whether the guest is active or inactive using a register in the interrupt moderation circuitry, and
update the register when a state of the guest changes; and the interrupt moderation circuitry is configured to:
determine whether the guest is active or inactive based, at least in part, on the register.

17. The system of claim 16, wherein said latency interrupt interval is related to a latency counter and said overflow interrupt interval is related to an overflow counter, the interrupt moderation circuitry is further configured to:
when the guest is active, reset the latency counter by starting another latency interrupt interval; and when the guest is inactive, resetting the overflow counter by starting another overflow interrupt interval.

18. The system of claim 15, wherein said overflow interrupt interval is related to an overflow counter, the interrupt moderation circuitry is further configured to:
reset the overflow counter by starting another overflow interrupt interval based on the first or the second.

19. The system of claim 15, wherein said latency interrupt interval is related to a latency counter, and wherein the host is further configured to:
receive the first or the second interrupt;
process the packet associated with the network application; and
reset the latency counter by starting another latency interrupt interval.

20. The network adapter of claim 19, wherein said overflow interrupt interval is related to an overflow counter, and wherein when the first interrupt is received by the host system, the host is further configured to:
reset the overflow counter by starting another overflow interrupt interval.

\* \* \* \* \*